A. RANKEILLOR.
CLOCK FOR ROVING OR SPINNING MACHINERY OR THE LIKE.
APPLICATION FILED JULY 30, 1909.

1,029,400.

Patented June 11, 1912.

2 SHEETS—SHEET 1.

WITNESSES:
M. D. Newman.
J. D. McPherson.

INVENTOR:
Alexander Rankeillor

A. RANKEILLOR.
CLOCK FOR ROVING OR SPINNING MACHINERY OR THE LIKE.
APPLICATION FILED JULY 30,-1909.
1,029,400.
Patented June 11, 1912.
2 SHEETS—SHEET 2.
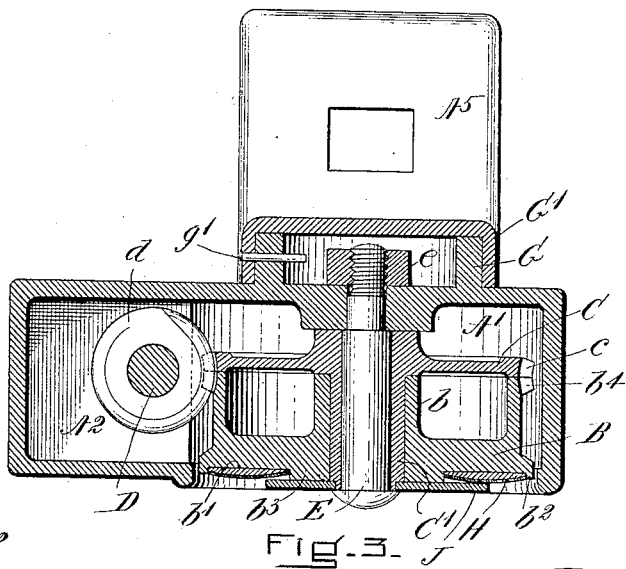
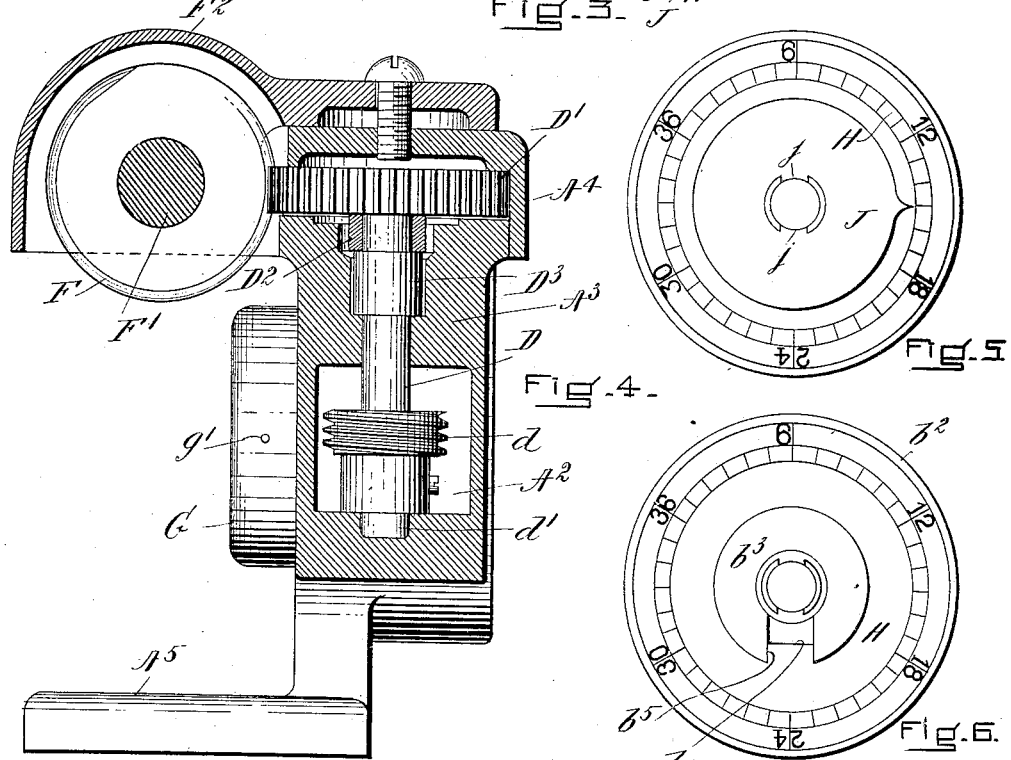
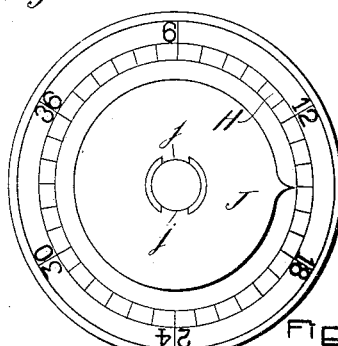
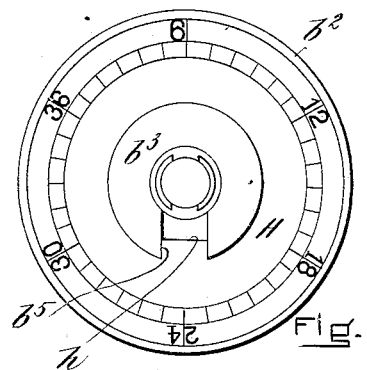

UNITED STATES PATENT OFFICE.

ALEXANDER RANKEILLOR, OF SACO, MAINE, ASSIGNOR, BY MESNE ASSIGNMENTS, TO SACO-PETTEE COMPANY, OF NEWTON, MASSACHUSETTS, A CORPORATION OF MASSACHUSETTS.

CLOCK FOR ROVING OR SPINNING MACHINERY OR THE LIKE.

1,029,400.      Specification of Letters Patent.      Patented June 11, 1912.

Application filed July 30, 1909. Serial No. 510,434.

*To all whom it may concern:*

Be it known that I, ALEXANDER RANKEILLOR, of Saco, in the county of York and State of Maine, a citizen of the United States, have invented a new and useful Improvement in Clocks for Roving or Spinning Machinery or the Like, of which the following is a specification.

Some device ordinarily called a register or clock is used for the purpose of counting automatically certain operations of a winding machine such as the number of hanks of yarn wound, etc. Where the operator of a machine is working by piece work it is of the utmost importance that the clock shall be so constructed that its interior cannot be tampered with, otherwise the operator is tempted to move the pointer or dial so that it will indicate more work done than is the fact.

It has been found that many operators are quite ingenious in their method of increasing the count of their work beyond that to which they are entitled, and my invention relates especially to a means for preventing such action.

My invention will be understood by reference to the drawings, in which—

Figure 1:
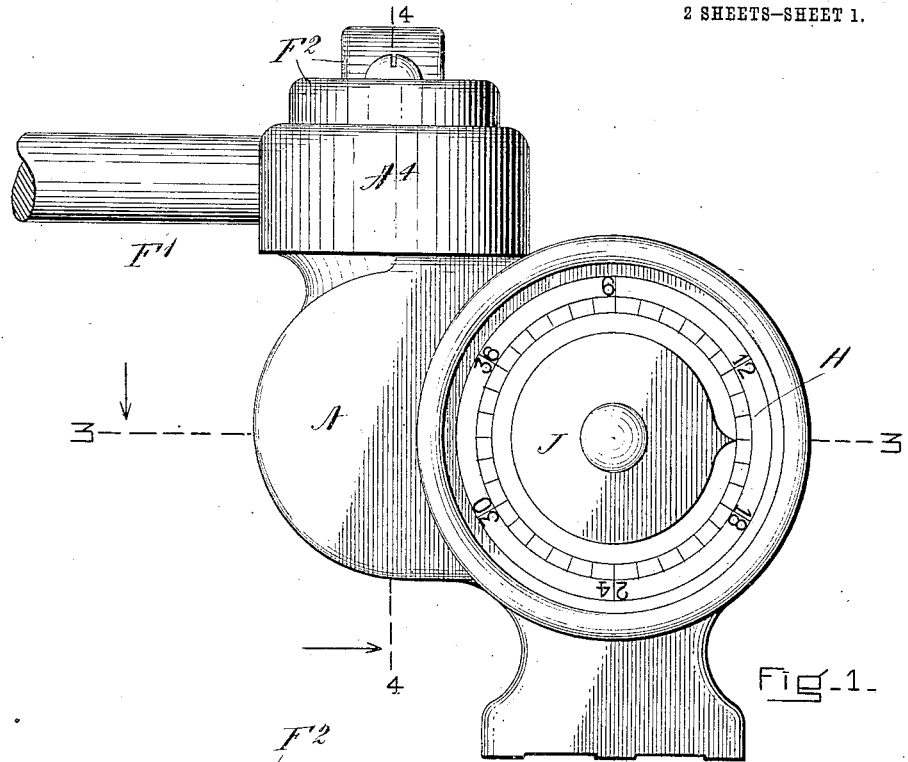
Figure 2:
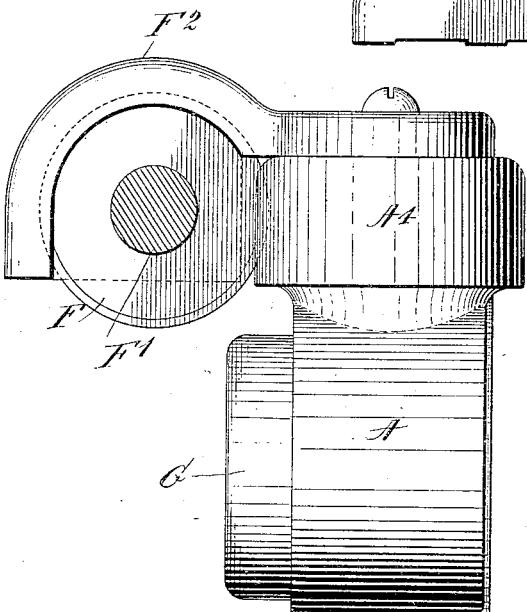

Figure 1 is a front elevation of a register or clock of well known construction to which my improvements have been added, Fig. 2 being a side elevation thereof. Figs. 3 and 4 are sections on lines 3—3 and 4—4, respectively, of Fig. 1, and Figs. 5 and 6 are details of the dial showing its means of attachment and the pointer by which the count is indicated.

The clock shown in the drawings to which my invention is applied comprises a casing A one side of which is open to display the dial. The main portion of the casing A has a chamber $A^1$ to receive the dial and pointer-carrier mechanism and a chamber $A^2$ to receive a shaft D which serves as an intermediary to transmit motion from the roving or other machine on which the clock is used, to the dial and pointer mechanism as below described.

I will first describe those parts of the machine which are well known in the art.

The dial carrier comprises a cylinder or shell B having an opening through it surrounded on the inside by a hub $b$. The front face is recessed as at $b^1$, the recess being formed between a rim $b^2$ on the periphery of the carrier and a collar or sleeve $b^3$ which surrounds the opening through the carrier. In this recess sits the dial H as below described. The hub $b$ on the interior serves with the rear edge of the cylinder as a bearing for the pointer carrier.

The pointer carrier comprises a disk C having a gear $c$ cut in its edge and a collar or sleeve $C^1$ which passes through the hub $b$ of the dial carrier and carries means on its front end by which the pointer may be so attached to it as to rotate positively with it. The dial carrier also has a gear $b^4$ upon its edge adjacent to the trolley gear $c$ and has one tooth more than the gear $c$. It rotates on the sleeve $C^1$ and the teeth of these two gears are engaged simultaneously by a spiral gear $d$ on the intermediary shaft D which is contained in the chamber $A^2$ of the casing. Thus the pointer and dial rotate differentially.

The dial carrier B and the pointer carrier C are attached to the casing by a bolt E which passes through the sleeve $C^1$ and through an opening in the rear of the casing A and is there held by a nut $e$. The bolt thus forms an arbor for the part $c$ and the sleeve $C^1$ provides the arbor for the part B.

The intermediary shaft D is stepped in a recess $d^1$ in the casing and passes up through the wall $A^3$ which forms the top of the chamber $A^2$ and is covered by a cap $A^4$. On its upper end it carries a gear $D^1$ which is engaged by a worm F on the end of the shaft $F^1$, the cap $A^4$ being cut away for this purpose. The shaft $F^1$ is turned by shafting from the power shaft of the machine. A hood $F^2$ is fastened to the casing by a screw to cover the worm F and the casing is provided with a bracket $A^3$ by which to attach it to the machine.

The dial H is usually made of sheet metal having an enameled face carrying any desired scale. As shown the scale indicates 36 units. The pointer J is also made of sheet metal.

In order to change the count of such a clock, it is necessary to change the relative position of the pointer and dial. This may be accomplished in the usual form of clock either by taking the dial and pointer out of the machine; turning the pointer with relation to the dial carrier or advancing the dial and pointer together by manipulating the shaft D, and each of these ways has been used by dishonest workmen.

To prevent tampering with the bolt E I provide a wall G around the opening in the casing through which the bolt E passes thus forming a chamber for the nut e. A cover G¹ incloses this chamber so as to prevent the nut from being reached without removing the cover. This cover may be held in place by a pin g¹ as shown or by solder or in any other way which shall render it difficult of quick removal and replacement.

It must be remembered that if the operator's attention is supposed to be given entirely to his work and any undue attention given by him to the clock would be apt to arouse suspicion on the part of his foreman then such a means as I provide to render it difficult to reach the bolt E is sufficient to make it exceedingly dangerous for the operator to try to tamper with the clock by taking it apart. If the only thing the operator has to do is to unscrew the nut e, slip out the dial and pointer mechanism, reset them and slip them back and tighten the nut e, this can be done little by little without attracting attention. The removal of the cover G¹ whether soldered or otherwise held in place is a more serious matter, requiring time both in removal and proper replacement.

To prevent the turning of the dial H by hand the collar b³ is notched as at b⁵ and the dial H which is provided with an opening of sufficient size to sit over the collar is provided with a tongue h which sits into the notch so that a dial and its carrier must always have the same relation to each other. The dial is held from falling from the recess by the pointer or by pins if thought best. The notch and tongue construction prevents the turning of the dial in any event.

The pointer J which is mounted on the upper end of the sleeve C¹ is prevented from turning with relation to it by means of two tongues j, j, which sit into corresponding notches in the end of the sleeve. The dial H and pointer J are preferably held in position on their respective collars or sleeves by a head on the bolt E.

The shaft F¹ being ordinarily quite long and slender is capable of being sprung, and by springing it very slightly the worm F can be separated from engagement with the gear D¹. When this has been done it is possible to move the dial and pointer by turning the intermediary shaft D and so advancing the dial and pointer with proper relation to each other. While this is not easy the shaft D has been turned by inserting a thread through the crack between the gear D¹ and the outer surface of the wall A³ and so getting it around the shaft D and then drawing the thread like a rope over a pulley, turning the shaft D. To render this impossible I provide a collar D² which is loose on the shaft D and is located between the gear D¹ and a collar D³ fixed on the shaft D so that any thread or wire inserted through the said crack can only engage the collar D² and turn it without turning the shaft, said collar being opposite said crack, that is projecting slightly above or outside of A³.

It has been proved that a clock with these safeguards is much more difficult to "beat" than the ordinary clock so that the utility of these improvements has been proved. So far as I know no clock has ever been constructed heretofore which is not only simple but is as perfect a register and is less likely to be tampered with as the one containing my improvements as above described.

I do not mean to limit myself to the precise form in which my invention is shown in the drawings; and it is to be understood that it is applicable to other forms of clock than that shown, but I have found that the clock shown as improved by me has proved superior over any now in use.

What I claim as my invention is:—

1. The clock above described comprising a casing, a shaft located therein, a counting mechanism connected to said shaft to be operated thereby, means for operating said shaft, one end of said shaft projecting through said casing, in combination with a loose collar on said shaft also projecting through said casing as described.

2. The clock above described comprising, in combination, a casing, counting mechanism within said casing including a collar or sleeve having a notched edge, operating means extending into said casing, an indicating member having a tongue to engage the notch in said collar or sleeve, a bolt passing through said collar or sleeve and adapted to hold said tongue in said notch and said counting mechanism in positive engagement with said operating means, a nut for holding said bolt in place, and means for preventing removal of said nut.

ALEXANDER RANKEILLOR

Witnesses:
 EDWARD T. HYDE,
 E. M. CLOUGH.